US011794762B2

(12) United States Patent
McGill et al.

(10) Patent No.: US 11,794,762 B2
(45) Date of Patent: Oct. 24, 2023

(54) PEER-TO-PEER OCCUPANCY ESTIMATION

(71) Applicant: TOYOTA RESEARCH INSTITUTE, INC., Los Altos, CA (US)

(72) Inventors: Stephen G. McGill, Cambridge, MA (US); Guy Rosman, Newton, MA (US); Luke S. Fletcher, Cambridge, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 565 days.

(21) Appl. No.: 16/845,765

(22) Filed: Apr. 10, 2020

(65) Prior Publication Data
US 2021/0316746 A1 Oct. 14, 2021

(51) Int. Cl.
*B60W 50/14* (2020.01)
*B60W 60/00* (2020.01)
*G05D 1/00* (2006.01)
*G06V 20/56* (2022.01)

(52) U.S. Cl.
CPC ........ *B60W 50/14* (2013.01); *B60W 60/0011* (2020.02); *B60W 60/0015* (2020.02); *G05D 1/0094* (2013.01); *G06V 20/56* (2022.01); *B60W 2050/143* (2013.01); *G05D 2201/0213* (2013.01)

(58) Field of Classification Search
CPC .............. G05D 1/0088; G05D 1/0094; G05D 2201/0213; G06T 7/136; B60W 50/14; B60W 60/0011; B60W 60/0015; B60W 2050/143; G06V 20/56
See application file for complete search history.

(56) References Cited

U.S. PATENT DOCUMENTS

| 2018/0130354 A1* | 5/2018 | Bender ................ G08G 1/0141 |
| 2019/0019416 A1* | 1/2019 | Perko .................. G05D 1/0088 |
| 2019/0168748 A1* | 6/2019 | Kroop ................. G05D 1/0038 |
| 2019/0222652 A1 | 7/2019 | Graefe et al. |
| 2020/0042017 A1* | 2/2020 | Kelkar ................ G01S 5/0072 |
| 2020/0137580 A1* | 4/2020 | Yang .................... H04W 12/06 |

(Continued)

FOREIGN PATENT DOCUMENTS

WO 2018158642 A1 9/2018

OTHER PUBLICATIONS

McGill, et al., "Probabilistic Risk Metrics for Navigating Occluded Intersections", IEEE Robotics and Automation Letters, Jul. 2019.

(Continued)

*Primary Examiner* — Abby Y Lin
*Assistant Examiner* — Renee LaRose
(74) *Attorney, Agent, or Firm* — SEYFARTH SHAW LLP

(57) ABSTRACT

A method for prioritizing occlusion information is presented. The method includes determining, at a first time period, a first sensor's view of a spatial area is occluded. The method also includes observing, at a second time period, the spatial area. The method further includes determining a level of risk associated with the spatial area based on the observation. The method still further includes prioritizing transmission of the occlusion information corresponding to the spatial area based on the determined level of risk and transmitting the occlusion information corresponding to the spatial area based on the priority.

20 Claims, 6 Drawing Sheets

(56) References Cited

U.S. PATENT DOCUMENTS

2021/0166564 A1* 6/2021 Takaki .................. G08G 1/167

OTHER PUBLICATIONS

Obst, et al., "Multi-Sensor Data Fusion for Checking Plausibility of V2V Communications by Vision-based Multiple-Object Tracking", 2014 IEEE Vehicular Networking Conference (VNC), Dec. 3-5, 2014.

Higuchi, et al., "Value-Anticipating V2V Communications for Cooperative Perception", Proceedings of the 2019 IEEE Intelligent Vehicles Symposium (IV), Paris, France, Jun. 9-12, 2019, pp. 1947-1952.

* cited by examiner

PEER-TO-PEER OCCUPANCY ESTIMATION

BACKGROUND

Field

Certain aspects of the present disclosure generally relate to vehicle warning systems.

Background

A vehicle warning system may warn a driver of a potentially dangerous situation. In response to the warning, the driver may initiate precautionary measures to avoid a potentially dangerous situation. The vehicle warning systems may sense a potentially dangerous situation based on information obtained from one or more vehicle sensors. In some cases, a potentially dangerous situation may not be visible to the vehicle's sensors. It is desirable to improve vehicle warning systems to provide warnings for potentially dangerous situations that are not visible to the vehicle's sensors.

SUMMARY

In one aspect of the present disclosure, a method for prioritizing occlusion information is disclosed. The method includes determining, at a first time period, a first sensor's view of a spatial area is occluded. The method also includes observing, at a second time period, the spatial area. The method further includes determining a level of risk associated with the spatial area based on the observation. The method still further includes prioritizing transmission of the occlusion information corresponding to the spatial area based on the determined level of risk. The method also includes transmitting the occlusion information corresponding to the spatial area based on the priority.

In another aspect of the present disclosure, a non-transitory computer-readable medium with non-transitory program code recorded thereon is disclosed. The program code is for prioritizing occlusion information. The program code is executed by a processor and includes program code to determine, at a first time period, a first sensor's view of a spatial area is occluded. The program code also includes program code to observe, at a second time period, the spatial area. The program code further includes program code to determine a level of risk associated with the spatial area based on the observation. The program code still further includes program code to prioritize transmission of the occlusion information corresponding to the spatial area based on the determined level of risk. The program code also includes program code to transmit the occlusion information corresponding to the spatial area based on the priority.

Another aspect of the present disclosure is directed to an apparatus for prioritizing occlusion information. The apparatus having a memory and one or more processors coupled to the memory. The processor(s) is configured to determine, at a first time period, a first sensor's view of a spatial area is occluded. The processor(s) is also configured to observe, at a second time period, the spatial area. The processor(s) is further configured to determine a level of risk associated with the spatial area based on the observation. The processor(s) still further configured to prioritize transmission of the occlusion information corresponding to the spatial area based on the determined level of risk. The processor(s) is also configured to transmit the occlusion information corresponding to the spatial area based on the priority.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
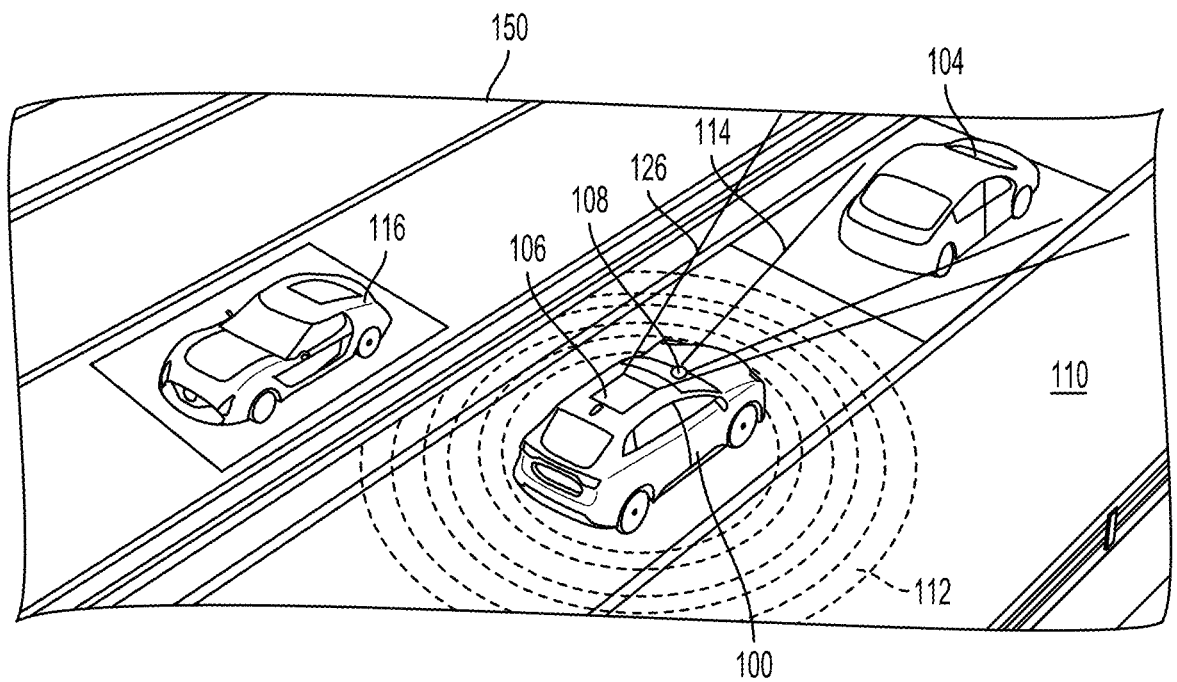
FIG. 1 illustrates an example of a vehicle in an environment according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

A vehicle warning system may warn an agent of a potentially dangerous situation. The potentially dangerous situation may be a situation that can harm the vehicle and/or occupants, such as a road hazard or an erratic agent (e.g., another vehicle or pedestrian). For example, the vehicle warning system may generate a warning when a distance between the vehicle and an object is less than a threshold. A driver and/or autonomous system may take precautionary measures to avoid the potentially dangerous situation. According to aspects of the present disclosure, the agent may operate in a manual mode, an autonomous mode, and/or a semi-autonomous mode.

In the manual mode, a human driver manually operates (e.g., controls) the vehicle. In the autonomous mode, a vehicle control system operates the vehicle without human intervention. In the semi-autonomous mode, the human may operate the vehicle, and the vehicle control system may override or assist the human. For example, the vehicle control system may override the human to prevent a collision or to obey one or more traffic rules.

Vehicle warning systems may sense potentially dangerous situations based on information obtained from one or more vehicle sensors. The sensors may include, for example, a red-green-blue (RGB) camera, a RADAR sensor, and/or a LIDAR sensor. In some cases, the potentially dangerous situation may not be visible to the vehicle's sensors. For example, the vehicles' sensors may not be within a visual range of the potentially dangerous situation. As another example, an object on the road may block a view of one or more sensors. It is desirable to improve vehicle warning systems to provide warnings for potentially dangerous situations that are not visible to the vehicle's sensors.

Aspects of the present disclosure are directed to prioritizing risk information that is shared between vehicles. In one configuration, risk information corresponding to an occluded area is prioritized based on a level of risk. risk information data may include information unavailable to the other agents due to, for example, occlusion or limited sensor range.

The risk information may be used by the other agents to estimate information (e.g., density, velocity, etc.) of road agents (e.g., vehicles) that may not be visible. The risk information may also be used to control one or more behaviors of the agent, such as speed, planned route, and/or other behaviors. The generated estimates may be more accurate in comparison to estimates generated without the shared risk information. The probability of a collision may decrease as more vehicles share data via a peer-to-peer network (e.g., a V2V network, a V2X network, etc.).

FIG. 1 illustrates an example of an ego vehicle 100 (e.g., ego agent) in an environment 150 according to aspects of the present disclosure. As shown in FIG. 1, the ego vehicle 100 is traveling on a road 110. A first vehicle 104 (e.g., other agent) may be ahead of the ego vehicle 100, and a second vehicle 116 may be adjacent to the ego vehicle 100. In this example, the ego vehicle 100 may include a 2D camera 108, such as a 2D RGB camera, and a LIDAR sensor 106. Other sensors, such as RADAR and/or ultrasound, are also contemplated. Additionally, or alternatively, the ego vehicle 100 may include one or more additional 2D cameras and/or LIDAR sensors. For example, the additional sensors may be side facing and/or rear facing sensors.

In one configuration, the 2D camera 108 captures a 2D image that includes objects in the 2D camera's 108 field of view 114. The LIDAR sensor 106 may generate one or more output streams. The first output stream may include a 3D cloud point of objects in a first field of view, such as a 360° field of view 112 (e.g., bird's eye view). The second output stream 124 may include a 3D cloud point of objects in a second field of view, such as a forward facing field of view.

The 2D image captured by the 2D camera includes a 2D image of the first vehicle 104, as the first vehicle 104 is in the 2D camera's 108 field of view 114. As is known to those of skill in the art, a LIDAR sensor 106 uses laser light to sense the shape, size, and position of objects in an environment. The LIDAR sensor 106 may vertically and horizontally scan the environment. In the current example, an artificial neural network (e.g., autonomous driving system) of the ego vehicle 100 may extract height and/or depth features from the first output stream. The autonomous driving system of the ego vehicle 100 may also extract height and/or depth features from the second output stream.

The information obtained from the sensors 106, 108 may be used to navigate the ego vehicle 100 along a route when the ego vehicle 100 is in an autonomous mode. The sensors 106, 108 may be powered from electricity provided from the vehicle's 100 battery (not shown). The battery may also power the vehicle's motor. The information obtained from the sensors 106, 108 may also identify risky agents.

Agents, such as vehicles, pedestrians, and bicyclists, may observe other agents, static environmental conditions, and/or dynamic environmental conditions via one or more sensors. The observations of one agent may be shared with other agents via a network, such as a V2V network or a V2X network. For brevity, static environmental conditions and dynamic environmental conditions may be referred to as static conditions and dynamic conditions.

In some cases, a view of one or more sensors may be occluded due to sensor failure, weather conditions (e.g., fog, sunlight), and/or other objects (e.g., a large tree, large vehicles). Accordingly, when a sensor fails to observe an area due to occlusion, the agent may fail to determine a level of risk associated with agents, static conditions, and/or dynamic conditions in the occluded area.

Based on sensor data, an agent may identify a location in a spatial area where one or more sensors are occluded. Location data may be used to determine a location where a view of the sensor was occluded. The location where the occlusion occurred may be shared with other agents. Additionally, or alternatively, after observing the previously occluded area, the agent may share information corresponding to the occluded area with other agents. In one configuration, risk information corresponding to the occluded area may be prioritized based on a level of risk. The level of risk may be determined based on the static environmental conditions of the occluded area, dynamic environmental conditions of the occluded area, and/or actions of agents in the occluded area.

Static conditions, such as objects on a road, potholes, uneven sidewalks, may increase a risk level. Dynamic conditions, such as rain, snow, or animals crossing a road, may also increase a risk level. Other agents may increase a risk level by engaging in risky behavior, such as, for example, swerving between lanes or failing to obey traffic laws. When a risky condition is identified, the ego agent may engage defensive measures to avoid an incident. The risky condition refers to a risk due to a static condition, dynamic condition, and/or a behavior of an agent. The agent performing the risky behavior (e.g., risky condition) may be referred to as the risky agent.

Other agents in proximity to a risky condition may fail to observe the cause of the risky condition, such as an object on the road. As such, the other agents may not have time to engage defensive measures before the agent is within a visual range of the risky condition. As discussed, the agent may fail to observe the risky condition area due to, for example, sensor occlusion, a distance from the risky condition, and/or other reasons.

For example, a target agent's sensor view may be occluded by a tree. As such, the target agent may fail to observe a risky condition occluded by the tree. In some cases, other agents have previously traveled the target agent's current route. As such, the other agents may have determined whether the tree is occluding a risky condition. If the tree is not occluding a risky condition, a low risk is assigned to the occlusion area. In contrast, if the tree is occluding a risky condition, a high risk is assigned to the occlusion area.

Risk information corresponding to the occlusion area may be prioritized according to the risk level assigned to the occlusion area. Risk information corresponding to a high risk occlusion area may be assigned a high priority. Risk information corresponding to a low risk occlusion area may be assigned a low priority. In the current application, risk information may also be referred to as information.

High priority information may be broadcasted by an ego agent, such that the warning is not targeted to specific agents. Rather, all agents within a broadcast range may be able to receive the transmitted high priority information. Additionally, or alternatively, a network may prioritize high priority information over other types of network traffic. For example, the network may delay transmission of low priority information to allocate resources (e.g., time slots, channels, bandwidth, etc.) to the high priority information. Low priority information may be transmitted when network resources become available. For example, low priority information may be transmitted when a network has unused bandwidth. The information prioritization may reduce network overhead.

Figure 2A:
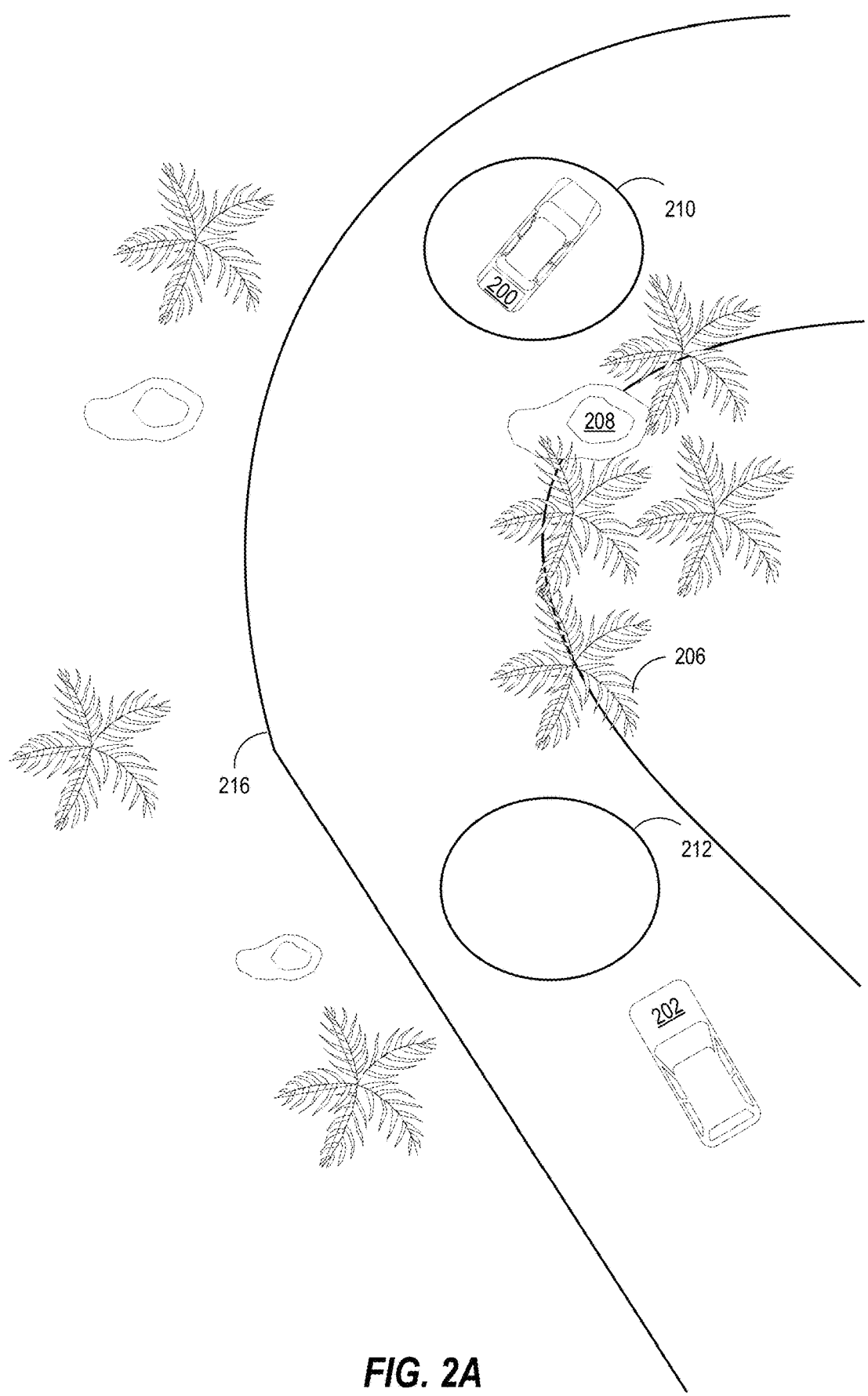
FIGS. 2A and 2B illustrate examples of sensor occlusion according to aspects of the present disclosure.

FIG. 2 illustrates an example of transmitting data from an ego agent according to aspects of the present disclosure. As shown in FIG. 2, an ego agent 200 is traveling on a road 216 and is ahead of a target agent 202. That is, the target agent 202 is also traveling on the road 216 in a same direction as the ego agent 200. The ego agent 200 and target agent 202 may be traveling on the road 216 at a same time or at different times. In either scenario, in the example of FIG. 2, the ego agent 200 has previously traveled along at least a portion of the target agent's 202 current route.

At its current location 210, the ego agent's 200 sensors (not shown) observe a rock 208 on the road 216. The ego agent 200 may use previously obtained sensor information as well as other information, such as location data and/or a layout (e.g., curve) of the road 216, to determine that the rock 208 was occluded by trees 206 at a previous location 212. As such, the ego agent 200 may also determine that sensors of other agents, such as the target agent 202, may not observe the rock 208 until the other agents reach the current location 210 on the road 216.

Based on training and/or previous observations, the ego agent 200 may determine that a probability of the rock 208 being on the road 216 is less than a threshold. In turn, based on the probability of an occurrence of the rock 208 on the road 216, the ego agent 200 determines that a probability of an incident is above a threshold. The ego agent 200 may assign a specific probability to an incident based on various factors, such as a size of the rock, location, visibility, and/or other conditions.

The ego agent 200 may also determine a magnitude of an incident. A highest magnitude may be one. For example, a collision with the rock 208 may be given a magnitude of one. As another example, swerving to avoid the rock 208 may be given a magnitude that is less than one. The magnitude may be determined based on training.

In one configuration, a risk for the area occluded by the trees 206 (e.g., the location of the rock 208) is an expected value of an incident. The expected value of the incident is a function of a probability of an incident (e.g., a bad incident) and a magnitude of an effect of the incident. In one configuration, the expected value of the incident is product of the probability of the incident and the magnitude the effect of the incident. A high risk may be assigned if the expected value of the incident is above a threshold.

For the example purposes, the area occluded by the trees 206 may be categorized as high risk. The area occluded by the trees 206 may be referred to as an occlusion area. In this example, because a high risk is assigned to the occlusion area, information corresponding to the occlusion area may be categorized as high priority information.

In one configuration, the ego agent 200 periodically receives vehicle information from the target agent 202. The vehicle information may include the target agent's 202 current location, velocity, direction of travel, and/or other information. Based on the target agent's 202 current location, the ego agent 200 may determine that the target agent 202 is approaching the rock 208. Because the rock 208 is occluded by the trees 206, the target agent's 202 sensors may fail to identify the rock 208. Therefore, the ego agent 200 transmits information corresponding to occlusion area. The transmitted information may identify a presence or absence of a risky condition, as well as information of the risky condition—should the risky condition exist. For example, the risky condition information may include the rock's 208 location, the tree's 206 location, a size of the rock 208, and/or other information.

Additionally, or alternatively, the target agent 202 may notify the ego agent 200 and/or other agents within a vicinity of the target agent 202 that the trees 206 are occluding a view of the target agent's 202 sensors. The occluded view notification transmitted from the target agent 202 may be a broadcast message, a unicast message to a particular agent, or a groupcast message to a group of agents.

In the current example, the ego agent 200 receives the occluded view notification from the target agent 202. In response, because the ego agent 200 is aware of the rock's 208 occlusion by the trees 206, the ego agent 200 transmits information corresponding information corresponding to occlusion area. In one configuration, if the occlusion area is not occluding a risky condition (e.g., the occlusion area is assigned a low risk), the ego agent 200 ignores the occluded view notification. Alternatively, if the occlusion area is assigned a low risk, the ego agent 200 may notify the target agent 202 that the occlusion area is not occluding a risky condition.

The high priority information may be transmitted as a broadcast message and/or given priority over other transmissions over the network (e.g., V2V network). For example, the high priority information may supersede low priority information scheduled to be transmitted from the ego agent 200 to the target agent 202.

If the rock 208 was not on the road 216, the ego agent 200 may determine that the area occluded by the trees 206 is a low risk area. In this example, transmissions from the ego agent 200 regarding the occlusion area may be categorized as low priority information. For example, in response to an occluded view notification from the target agent 202, the ego agent 200 may still transmit information regarding the occlusion area. However, if the rock 208 is not on the road, such a transmission would be categorized as a low priority transmission.

Figure 2B:
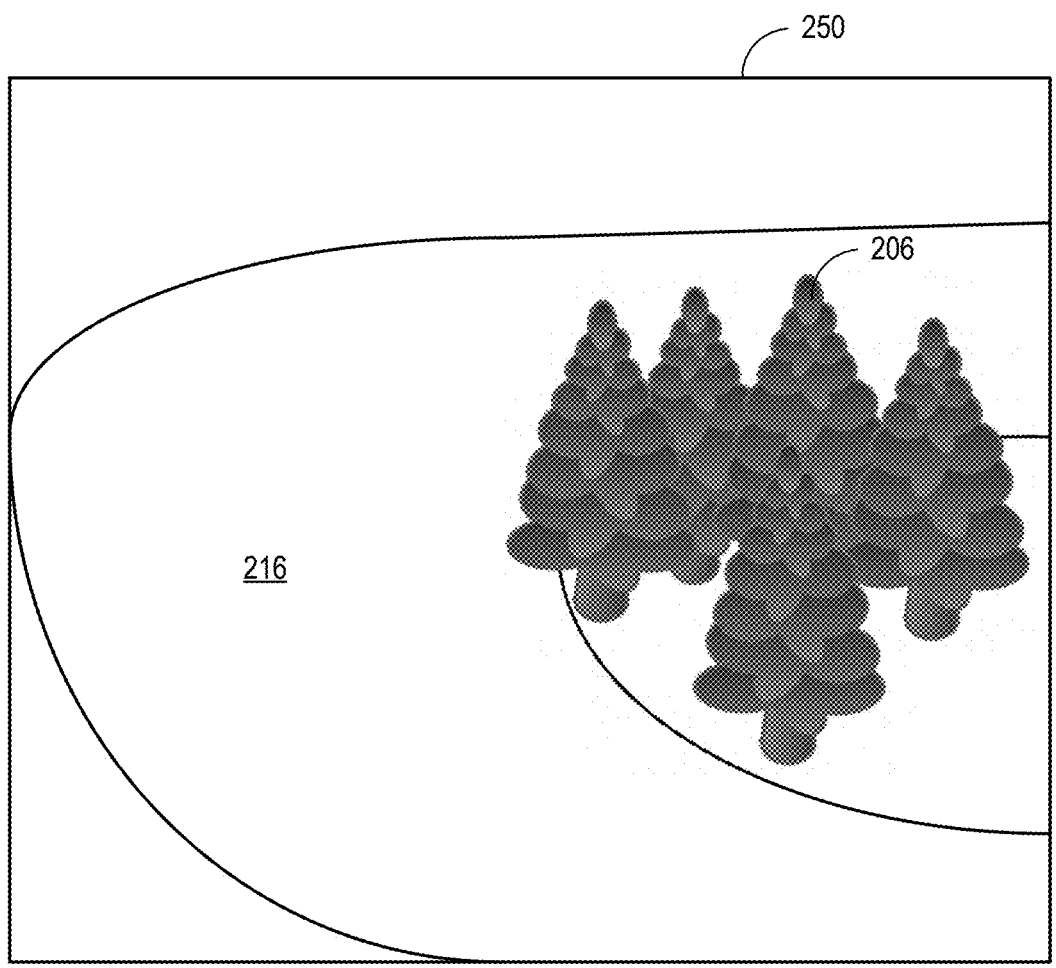

FIG. 2B illustrates an example of an occluded sensor view 250 according to aspects of the present disclosure. In the example of FIG. 2B, the sensor view 250 is a forward view of the target agent 202. As discussed, the sensor may be an RGB camera, RADAR, LIDAR, or another type of sensor. The target agent 202 may include one or more sensors.

As shown in FIG. 2B, the sensor captures the road 216 and trees 206. Based on the captured view 250, the target agent 202 may determine that the trees 206 are occluding a portion of the road 216. In response to determining that the sensor's view is occluded, the target agent 202 may transmit an occluded view notification. The occluded view notification may be a broadcast message, a unicast message to a particular agent, or a groupcast message to a group of agents.

An agent, such as the ego agent 200, may receive the occluded view notification. If the agent receiving the occluded view notification has knowledge of the occluded area (e.g., the area of the road 216 occluded by the trees 206), the agent may respond to the target agent 202 with information corresponding to the portion of the road 216 that is occluded by the trees 206.

The response may be prioritized based on a risk associated with the occluded area. For example, the response may be given a high priority if pertinent information is occluded. Alternatively, the response may be given a low priority if non-pertinent information is occluded. The occlusion is not limited to an object blocking a view. The occlusion may be caused by other factors, such as weather, loss of signal, damaged sensor, and/or other causes.

Figure 3:
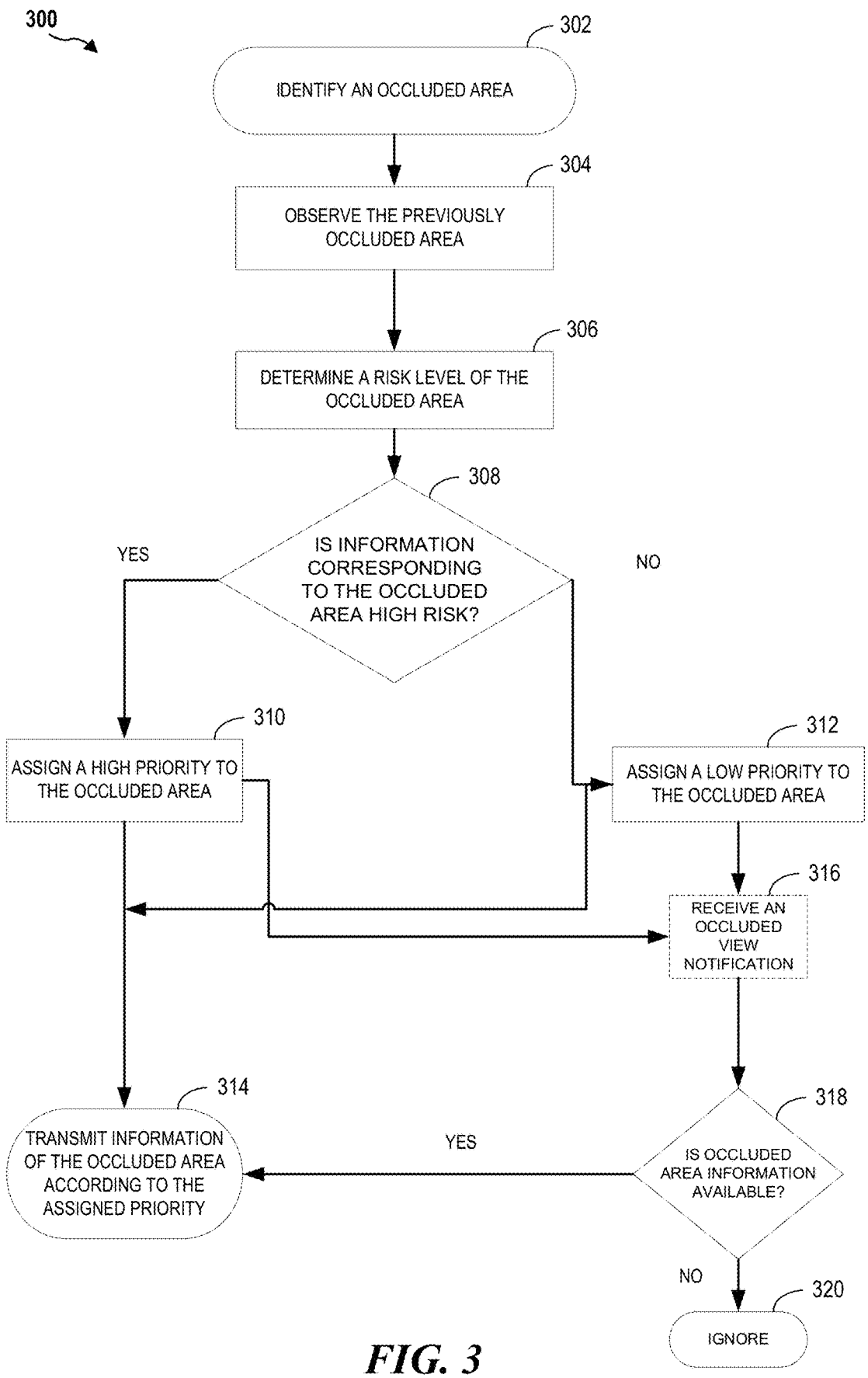
FIG. 3 illustrates a flow diagram for a prioritizing occlusion information according to aspects of the present disclosure.

FIG. 3 illustrates a flow diagram for transmitting occlusion information according to aspects of the present disclosure. As shown in FIG. 3, at block 302 an ego agent identifies an occluded area. An occluded area refers to an area where a view of one or more of the ego agent's sensors is occluded. For example, an object may be blocking a portion of the sensor's view, weather conditions may prevent accurate sensor readings, and/or environmental conditions cause a loss of signal. An agent may be a vehicle, pedestrian, bicyclist, or another type of mechanized equipment (e.g., an electric scooter) in an environment.

At block 304, at a time period after identifying the occluded area, the ego agent observes the previously occluded area. For example, a portion of a road may have been occluded by an object, such as a tree. At a later time period, the ego agent may pass by or through the area that was occluded by the object and observe the previously occluded area. As another example, at a first time period, a forward view sensor of the ego agent may have lost signal or have been occluded due to weather conditions, such that the forward view sensor could not obtain a forward view. At a later time period, as the ego agent moves forward, one or more sensors, such as a side sensor or rear sensor may observe the area that was not visible via the forward view sensor at the first time period.

As discussed, the ego agent performs observations via one or more sensors of the ego agent. For example, an ego agent's warning system receives and interprets sensor data. The warning system may be an artificial neural network. Additionally, or alternatively, the ego agent may receive information regarding the agent's behavior from one or more infrastructure sensors, such as a camera on a traffic signal.

At block 306, based on the observations of the previously occluded area, the ego agent determines a risk level of the occluded area. The risk level may be determined based on an expected value of an incident. As discussed, the expected value is a function of a probability of an incident and a magnitude of the incident. The probability of the incident may be based on a probability of actions of another agent in the observed area, static environmental conditions of the observed area, and/or dynamic environmental conditions of the observed area.

The probability of an incident may be inversely related to a probability of an occurrence of the actions of the other agent, a probability of static environmental conditions, and/ or a probability of dynamic environmental conditions. For example, a probability of an incident may increase as the probability of a static environmental condition decreases. In addition to, or alternate from, the probabilities discussed above, the probability of the incident may be based on other factors.

The probabilities may be assigned based on training. For example, an agent or a component of the agent (e.g., a warning system) may be trained on behavior data of various agents. The training may be updated as the agent observes real-world behaviors. The behavior data may include high probability behaviors and low probability behaviors.

A high probability behavior refers to behavior with a probability value that is greater than or equal to a high probability threshold. For example, high probability behaviors generally relate to behaviors in accordance with traffic regulations, such as, driving on a correct side of a road and following a posted speed limit. As another example, high probability static environmental conditions generally relate to conditions in accordance with the surrounding environment. For example, when driving on a road, the high probability static conditions include stop signs on street corners, paved roads, clear lane markings, etc. High probability dynamic environmental conditions generally relate to dynamic conditions in accordance with the surrounding environment. For example, when driving on a road, the high probability dynamic conditions include clear visibility, low wind, etc.

A low probability behavior refers to behavior with a probability value that is less than or equal to a low probability threshold. Low probability behaviors generally relate to behaviors that are not in accordance with traffic regulations, such as, driving on a wrong side of a road, exceeding a posted speed limit, and swerving between lanes. As another example, low probability static environmental conditions generally relate to conditions that are not in accordance with the surrounding environment. For example, when driving on a road, the low probability static conditions include broken traffic signals, un-paved roads, objects in the road, etc. Low probability dynamic environmental conditions generally relate to dynamic conditions that are not in accordance with the surrounding environment. For example, when driving on a road, the low probability dynamic conditions include poor visibility, high wind, road construction, closed roads, etc.

The thresholds may be pre-set by a user or a manufacturer. Additionally, or alternatively, the thresholds may be dynamically adjusted based on driving conditions, environment, user preference, and/or other factors. Other behavior categories, such as medium probability, may also be used.

At block 308, based on the determined risk level, the ego agent determines if information corresponding to the occluded area is high risk information. That is, the ego agent determines whether high risk information is occluded. If the occluded area is not occluding high risk information, the ego agent assigns a low priority to the occluded area (block 312). That is, information corresponding to the occluded area is assigned a low priority. The low priority information may be transmitted when network resources, such as bandwidth, is available.

If the occluded area is occluding high risk information, the ego agent assigns a high priority to the occluded area (block 310). That is, information corresponding to the occluded area is assigned a high priority. The high priority information may be prioritized over other network resources and/or transmitted via a broadcast message.

After assigning the priority to the occluded area (blocks 310, 312), in an optional configuration, at block 316, the ego agent receives an occluded view notification from a target agent. The occluded view notification notifies the ego agent that a view of one or more sensors of the target agent is occluded. That is, the occluded view notification identifies an area that is occluded from one or more of the target agent's sensors. The occluded view notification may be a broadcast message, unicast message, or a groupcast message.

In response to receiving the occluded view notification, the ego agent determines if it has obtained information corresponding to the occluded area (e.g., spatial area) included in the occluded notification (block 318). For example, the ego agent may have previously passed through the area corresponding to the occluded area identified in the occluded view notification. If the ego agent has information corresponding to the occluded area, the ego agent transmits the information according to the assigned priority (block 314). If the ego agent does not have information corresponding to the occluded area, the ego agent may ignore the received notification (block 320). Alternatively, the ego agent may notify the target agent that it does not have the requested information (not shown in FIG. 3).

In one configuration, after assigning the priority to the occluded area (blocks 310, 312), the ego agent transmits the information according to the assigned priority (block 314). That is, the ego agent may transmit the information regardless of whether the ego agent received an occluded view notification.

In response to receiving the information, a driver of the target agent may be notified via an in-cabin output, such as an audio message or a message displayed on a user interface. As an example, the message is displayed on a heads-up display or a head unit of the target agent. In addition to notifying the driver of the risk, the message may include a description of the risk and/or other pertinent information.

An autonomous or semi-autonomous driving system of the target agent may also process the received information. The target agent's driving system and/or driver may initiate a defensive driving mode based on a level of risk. For example, the target agent's driving system and/or driver may change velocity and/or trajectory (e.g., slow down or stop before entering the occluded area). Additionally, the ego agent's driving system and/or driver may initiate a defensive driving mode in response to identification of the risky area.

As discussed, agents in an environment may transmit and/or receive messages via a V2V network, an infrastructure network, a V2X network, a V2I network, a V2N network, a V2P network, and/or another type of network. V2N and V2V networks may connect agents to cloud services and wireless infrastructure (e.g., LTE, 5G, etc.). For example, real-time information about traffic, routes, and/or road situations may be communicated over the V2N and V2V networks. The agents may also transmit information agent-centric information, such as, an agent's location, direction, speed, braking status, and/or steering wheel position.

In a V2I network, agents may communicate with road infrastructure, such as traffic signals. V2I sensors collect information about traffic, traffic light states, radar devices, cameras, and other road signals. Nodes in a V2I network may work together to improve throughput. In a V2P network, agents may communicate with pedestrians. For example, a vehicle may transmit a message to a pedestrian's mobile device. In a V2X network, the agent may collect and share information with any other node (e.g., network, person, infrastructure) in the environment. That is, V2X networks may be a combination of all other types of agent communication.

Aspects of the present disclosure are not limited to a V2V system. V2X systems and other communication systems are also contemplated.

Additionally, aspects of the present disclosure are directed to a reward system that provides rewards to the ego vehicle (e.g., driver) based on the shared data. The reward may be in the form of monetary compensation, honor points, or other types of rewards. Additionally, or alternatively, the reward system may reward or penalize the ego agent based on the reliability or trustworthiness of the shared data (e.g., based on whether the data shared by the ego agent is consistent with data shared by other agents). The target agent may disregard data shared by the ego agent if the reward system determines the ego agent's shared data is consistently unreliable.

According to aspects of the present disclosure, if a vehicle is operating in a manual mode, an autonomous or semi-autonomous driving mode may be initiated based on a level of risk of the occluded area information. The autonomous or semi-autonomous driving mode may overtake the manual operation or assist the manual operation in averting a potentially dangerous situation, such as a collision.

Figure 4:
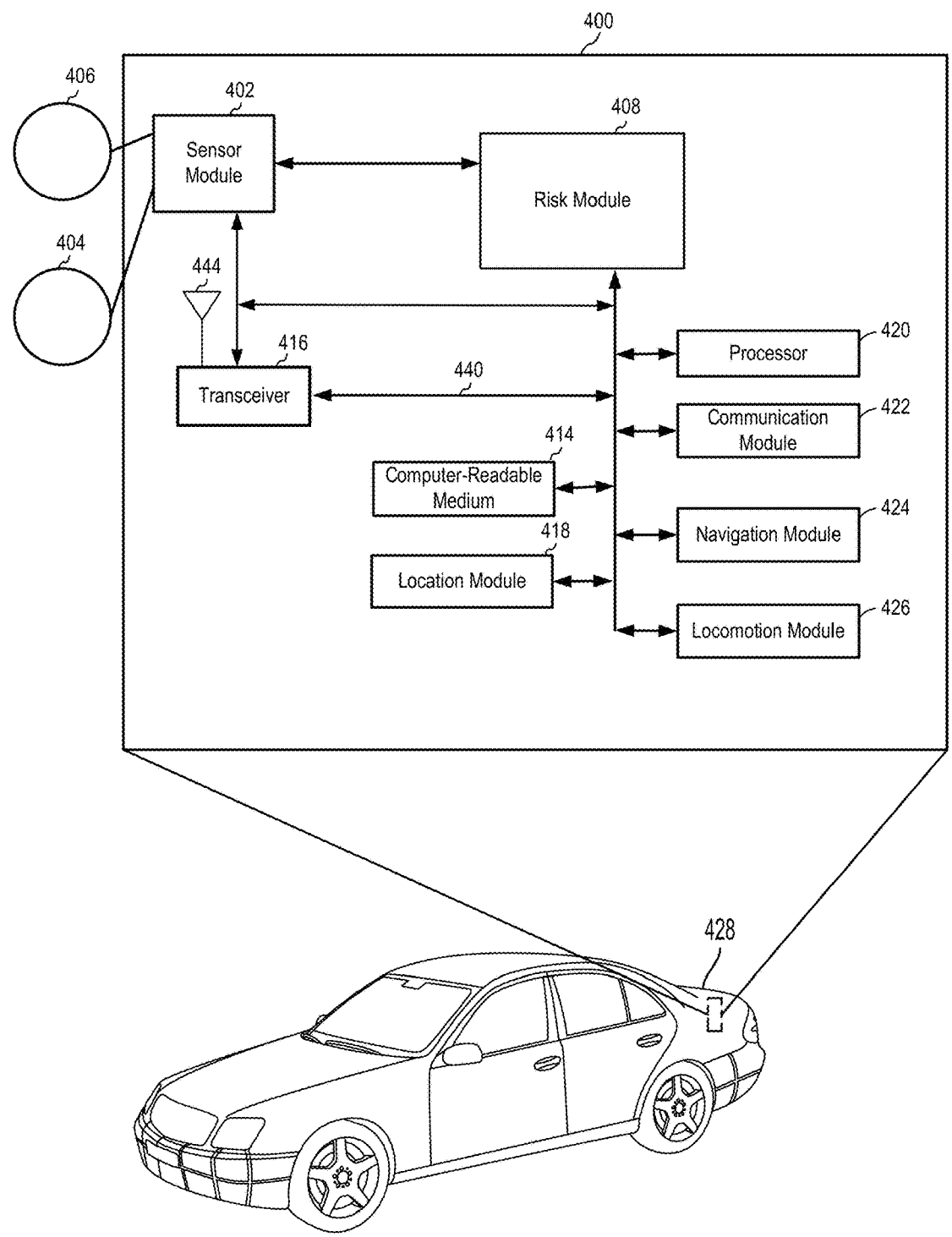
FIG. 4 is a diagram illustrating an example of a hardware implementation for an occlusion information prioritization system according to aspects of the present disclosure.

FIG. 4 is a diagram illustrating an example of a hardware implementation for an occlusion information prioritization system 400, according to aspects of the present disclosure. The occlusion information prioritization system 400 may be a component of a vehicle, a robotic device, or another device. For example, as shown in FIG. 4, the occlusion information prioritization system 400 is a component of a vehicle 428. Aspects of the present disclosure are not limited to the occlusion information prioritization system 400 being a component of the vehicle 428, as other types of agents, such as a bus, boat, drone, or robot, are also contemplated for using the occlusion information prioritization system 400.

The vehicle 428 may operate in one or more of an autonomous operating mode, a semi-autonomous operating mode, and a manual operating mode. Furthermore, the vehicle 428 may be an electric vehicle, a hybrid vehicle, a fuel vehicle, or another type of vehicle.

The occlusion information prioritization system 400 may be implemented with a bus architecture, represented generally by a bus 440. The bus 440 may include any number of interconnecting buses and bridges depending on the specific application of the occlusion information prioritization system 400 and the overall design constraints. The bus 440 links together various circuits including one or more processors and/or hardware modules, represented by a processor 420, a communication module 422, a location module 418, a sensor module 402, a locomotion module 426, a navigation module 424, and a computer-readable medium 414. The bus 440 may also link various other circuits such as timing sources, peripherals, voltage regulators, and power management circuits, which are well known in the art, and therefore, will not be described any further.

The occlusion information prioritization system 400 includes a transceiver 416 coupled to the processor 420, the sensor module 402, a risk module 408, the communication module 422, the location module 418, the locomotion module 426, the navigation module 424, and the computer-readable medium 414. The transceiver 416 is coupled to an antenna 444. The transceiver 416 communicates with various other devices over one or more communication networks, such as an infrastructure network, a V2V network, a V2I network, a V2X network, a V2P network, or another type of network. As an example, the transceiver 416 may transmit a warning to other agents when a risk module 408 determines that an occluded area is occluding high risk information.

The occlusion information prioritization system 400 includes the processor 420 coupled to the computer-readable medium 414. The processor 420 performs processing, including the execution of software stored on the computer-readable medium 414 providing functionality according to the disclosure. The software, when executed by the processor 420, causes the occlusion information prioritization system 400 to perform the various functions described for a particular device, such as the vehicle 428, or any of the modules 402, 408, 414, 416, 418, 420, 422, 424, 426. The computer-readable medium 414 may also be used for storing data that is manipulated by the processor 420 when executing the software.

The sensor module 402 may be used to obtain measurements via different sensors, such as a first sensor 406 and a second sensor 404. The first sensor 406 may be a vision sensor, such as a stereoscopic camera or a red-green-blue (RGB) camera, for capturing 2D images. The second sensor 404 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 404, 406.

The measurements of the first sensor 406 and the second sensor 404 may be processed by one or more of the processor 420, the sensor module 402, the risk module 408, the communication module 422, the location module 418, the locomotion module 426, the navigation module 424, in conjunction with the computer-readable medium 414 to implement the functionality described herein. In one configuration, the data captured by the first sensor 406 and the second sensor 404 may be transmitted to an external device via the transceiver 416. The first sensor 406 and the second sensor 404 may be coupled to the vehicle 428 or may be in communication with the vehicle 428.

The location module 418 may be used to determine a location of the vehicle 428. For example, the location module 418 may use a global positioning system (GPS) to determine the location of the vehicle 428. The communication module 422 may be used to facilitate communications via the transceiver 416. For example, the communication module 422 may be configured to provide communication capabilities via different wireless protocols, such as WiFi, long term evolution (LTE), 4G, etc. The communication module 422 may also be used to communicate with other components of the vehicle 428 that are not modules of the occlusion information prioritization system 400.

The locomotion module 426 may be used to facilitate locomotion of the vehicle 428. As an example, the locomotion module 426 may control a movement of the wheels. As another example, the locomotion module 426 may be in communication with one or more power sources of the vehicle 428, such as a motor and/or batteries. Of course, aspects of the present disclosure are not limited to providing locomotion via wheels and are contemplated for other types of components for providing locomotion, such as propellers, treads, fins, and/or jet engines.

The occlusion information prioritization system 400 also includes the navigation module 424 for planning a route or controlling the locomotion of the vehicle 428, via the locomotion module 426. In one configuration, the navigation module 424 engages a defensive driving mode when the risk module 408 identifies a risky agent. The navigation module 424 may override user input when the user input is expected (e.g., predicted) to cause a collision. The modules may be software modules running in the processor 420, resident/stored in the computer-readable medium 414, one or more hardware modules coupled to the processor 420, or some combination thereof.

The risk module 408 may be in communication with the sensor module 402, the transceiver 416, the processor 420, the communication module 422, the location module 418, the locomotion module 426, the navigation module 424, and the computer-readable medium 414. In one configuration, the risk module 408 receives sensor data from the sensor module 402. The sensor module 402 may receive the sensor data from the first sensor 406 and the second sensor 404. According to aspects of the present disclosure, the sensor module 402 may filter the data to remove noise, encode the data, decode the data, merge the data, extract frames, or perform other functions. In an alternate configuration, the risk module 408 may receive sensor data directly from the first sensor 406 and the second sensor 404.

In one configuration, the risk module 408 determines whether the sensor data is occluded. The risk module 408 determines a geographic location that is occluded. For example, an area that is one hundred feet ahead of the vehicle 428 may be occluded. The geography location may be determined from information provided by one or more of the navigation module 424, locomotion module 426, and/or location module 418.

At a later time period, the risk module 408 observes the previously occluded area via sensor data provided from the sensor module 402. The risk module 408 may determine if the occluded area includes high risk information. That is, the sensor module determines whether high risk information was occluded at a previous time when a view of one or more sensors 404, 406 was occluded. The risk is based on observations of the previously occluded area. Specifically, the risk may be based on an expected value of an incident determined from the observations. The expected value of the incident is a function (e.g., product) of a probability of an occurrence of the incident at the spatial area and a magnitude of an effect of the incident.

The risk module 408 may prioritize the information corresponding to the occluded area based on the determined risk. In one configuration, the transceiver 416 and/or the communication module 422 receive an occluded view notification from an agent and forward the received occluded view notification to the risk module 408. In response, the risk module 408 may transmit information to a target agent that transmitted the occluded view notification. The transmission may be prioritized by a communication module 422 based on a priority of the information. Additionally, or alternatively, upon determining a risk of the occluded area, the risk module 408 may transmit the information. The information may be transmitted using one or more of the communication module 422, transceiver 416, and/or antenna 444.

Figure 5:
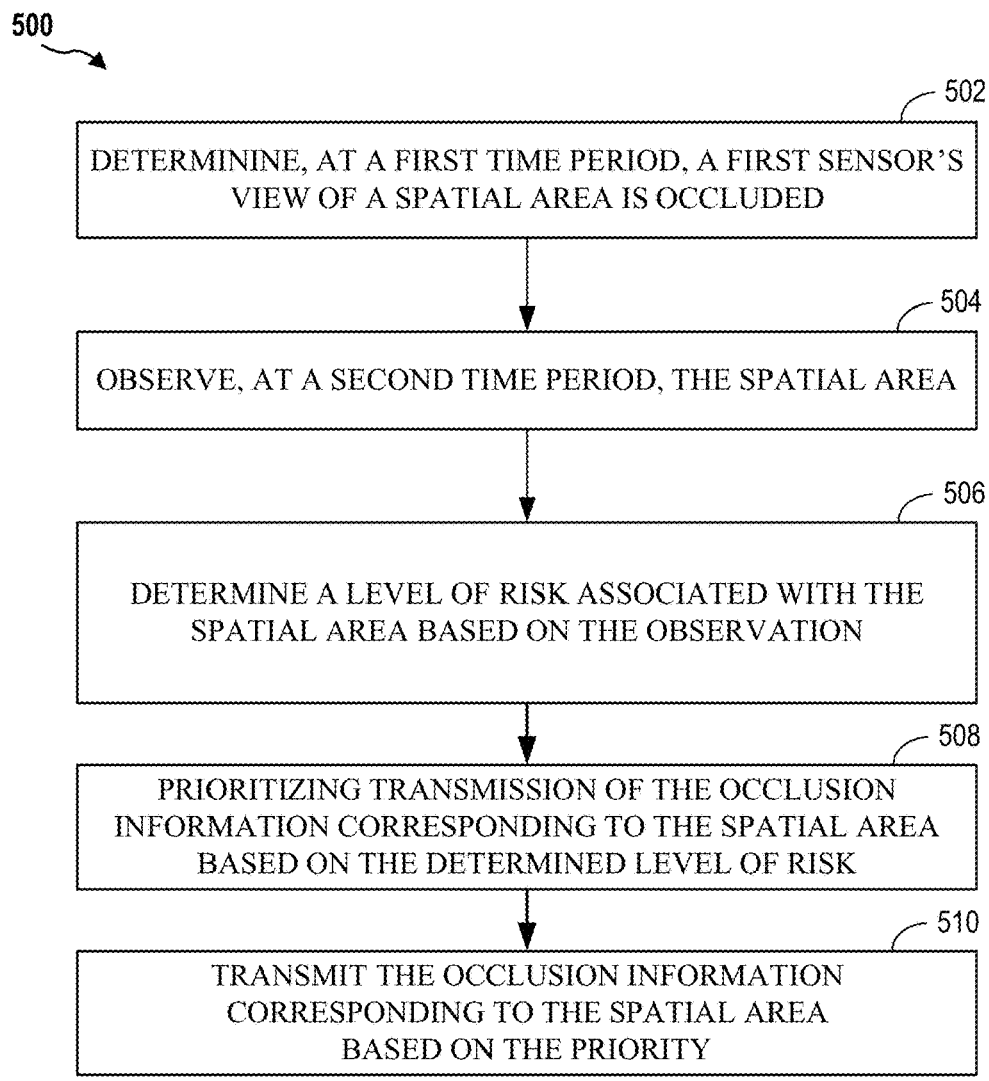
FIG. 5 illustrates a flow diagram for a method of prioritizing occlusion information according to aspects of the present disclosure.

FIG. 5 illustrates a flow diagram 500 for prioritizing occluded area information according to aspects of the present disclosure. As shown in FIG. 5, at block 502, an ego agent determines, at a first time period, a first sensor's view of a spatial area is occluded. Additionally, at block 504, the ego agent observes, at a second time period, the spatial area.

The observations may be performed via one or more sensors. The sensors may include one or more of the first sensor and the second sensor comprise a red-green-blue camera, a RADAR sensor, and a LiDAR sensor. In one configuration, the spatial area is observed at the second time period via the first sensor when the first sensor's view is no longer occluded or a second sensor when the first sensor's view is occluded.

At block 506, the ego agent determines a level of risk associated with the spatial area based on the observation. The level of risk may be based on an expected value of an incident determined from the observation. In one configuration, the expected value of the incident is a function (e.g., product) of a probability of an occurrence of the incident at the spatial area and a magnitude of an effect of the incident. The probability of the occurrence may be determined based on one or more of a probability of an occurrence an observed action of an agent in the spatial area, an observed static environmental condition in the spatial area, and an observed dynamic environmental condition in the spatial area.

At block 508, an ego agent prioritizes transmission of the occlusion information corresponding to the spatial area based on the determined level of risk. In one configuration, the ego agent assigns a high priority to the occlusion information when the expected value of the incident is less than a threshold. Additionally, the ego agent assigns a low priority to the occlusion information when the expected value of the incident is greater than a threshold.

At block 510, the ego agent transmits the occlusion information corresponding to the spatial area based on the priority. In one configuration, the ego agent broadcasts the occlusion information or prioritizing the occlusion information over low priority scheduled transmissions when the priority is a high priority. Additionally, the ego agent schedules the transmission of the occlusion information based on an availability of transmission resources when the priority is a low priority. The occlusion information may be transmitted to a target agent via a peer-to-peer transmission, such as a V2X transmission.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for prioritizing occlusion information, comprising:
    observing, at a first location of an ego agent, a spatial area from a first viewpoint, at the first location, of one or more sensors associated with the ego agent;
    observing, at a second location of the ego agent, the spatial area from a second viewpoint of the one or more sensors associated with the ego agent;
    determining the spatial area was occluded at the first viewpoint based on observing the spatial area from the second viewpoint;
    determining a level of risk associated with the spatial area based on observing the spatial area at the second location;
    prioritizing transmission of occlusion information corresponding to the spatial area based on the determined level of risk; and
    transmitting, to a target agent, the occlusion information corresponding to the spatial area based on the priority.

2. The method of claim 1, further comprising determining the level of risk based on an expected value of an incident determined based on observing the spatial area at the second location.

3. The method of claim 2, in which the expected value of the incident is a function of a probability of an occurrence of the incident at the spatial area and a magnitude of an effect of the incident.

4. The method of claim 3, further comprising determining the probability of the occurrence of the incident based on at least one of a probability of an occurrence an observed action of an agent in the spatial area, an observed static environmental condition in the spatial area, and an observed dynamic environmental condition in the spatial area.

5. The method of claim 2, further comprising:
    assigning a high priority to the occlusion information when the expected value of the incident is less than a threshold; and
    assigning a low priority to the occlusion information when the expected value of the incident is greater than a threshold.

6. The method of claim 1, further comprising:
    broadcasting the occlusion information or prioritizing the occlusion information over low priority scheduled transmissions when the priority is a high priority; and
    scheduling the transmission of the occlusion information based on an availability of transmission resources when the priority is a low priority.

7. The method of claim 1, in which:
the spatial area is observed from the second viewpoint via a second sensor of the one or more sensors based on a first sensor of the one or more sensors being occluded at the second viewpoint; and
the first sensor and the second sensor comprise at least one of a red-green-blue camera, a RADAR sensor, a LiDAR sensor, or a combination thereof.

8. The method of claim 1, further comprising transmitting the occlusion information to the target agent via a peer-to-peer transmission.

9. An apparatus for prioritizing occlusion information, comprising:
a processor; and
a memory coupled with the processor and storing instructions operable, when executed by the processor, to cause the apparatus:
to observe, at a first location of an ego agent, a spatial area from a first viewpoint, at the first location, of one or more sensors associated with the ego agent;
to observe, at a second location of the ego agent, the spatial area from a second viewpoint of the one or more sensors associated with the ego agent;
to determine the spatial area was occluded at the first viewpoint based on observing the spatial area from the second viewpoint;
to determine a level of risk associated with the spatial area based on observing the spatial area at the second location;
to prioritize transmission of occlusion information corresponding to the spatial area based on the determined level of risk; and
to transmit, to a target agent, the occlusion information corresponding to the spatial area based on the priority.

10. The apparatus of claim 9, in which execution of the instructions further cause the apparatus to determine the level of risk based on an expected value of an incident determined based on observing the spatial area at the second location.

11. The apparatus of claim 10, in which the expected value of the incident is a function of a probability of an occurrence of the incident at the spatial area and a magnitude of an effect of the incident.

12. The apparatus of claim 11, in which execution of the instructions further cause the apparatus to determine the probability of the occurrence of the incident based on at least one of a probability of an occurrence an observed action of an agent in the spatial area, an observed static environmental condition in the spatial area, and an observed dynamic environmental condition in the spatial area.

13. The apparatus of claim 10, in which execution of the instructions further cause the apparatus:
to assign a high priority to the occlusion information when the expected value of the incident is less than a threshold; and
to assign a low priority to the occlusion information when the expected value of the incident is greater than a threshold.

14. The apparatus of claim 9, in which execution of the instructions further cause the apparatus:
to broadcast the occlusion information or prioritizing the occlusion information over low priority scheduled transmissions when the priority is a high priority; and
to schedule the transmission of the occlusion information based on an availability of transmission resources when the priority is a low priority.

15. The apparatus of claim 9, in which in which:
the spatial area is observed from the second viewpoint via a second sensor of the one or more sensors based on a first sensor of the one or more sensors being occluded at the second viewpoint; and
the first sensor and the second sensor comprise at least one of a red-green-blue camera, a RADAR sensor, a LiDAR sensor, or a combination thereof.

16. The apparatus of claim 9, in which execution of the instructions further cause the apparatus to transmit the occlusion information to the target agent via a peer-to-peer transmission.

17. A non-transitory computer-readable medium having program code recorded thereon for prioritizing occlusion information, the program code executed by a processor and comprising:
program code to observe, at a first location of an ego agent, a spatial area from a first viewpoint, at the first location, of one or more sensors associated with the ego agent;
program code to observe, at a second location of the ego agent, the spatial area from a second viewpoint of the one or more sensors associated with the ego agent;
program code to determine the spatial area was occluded at the first viewpoint based on observing the spatial area from the second viewpoint;
program code to determine a level of risk associated with the spatial area based on observing the spatial area at the second location;
program code to prioritize transmission of occlusion information corresponding to the spatial area based on the determined level of risk; and
program code to transmit, to a target agent, the occlusion information corresponding to the spatial area based on the priority.

18. The non-transitory computer-readable medium of claim 17, further comprising program code to determine the level of risk based on an expected value of an incident determined based on a function of a probability of an occurrence of the incident at the spatial area and a magnitude of an effect of the incident.

19. The apparatus of claim 10, further comprising:
program code to assign a high priority to the occlusion information when the expected value of the incident is less than a threshold; and
program code to assign a low priority to the occlusion information when the expected value of the incident is greater than a threshold.

20. The apparatus of claim 9, further comprising:
program code to broadcast the occlusion information or prioritize the occlusion information over low priority scheduled transmissions when the priority is a high priority; and
program code to schedule the transmission of the occlusion information based on an availability of transmission resources when the priority is a low priority.

* * * * *